June 24, 1958   R. C. ZELLER   2,839,904
BALANCING MEANS FOR UNIVERSAL JOINTS
Filed April 8, 1957
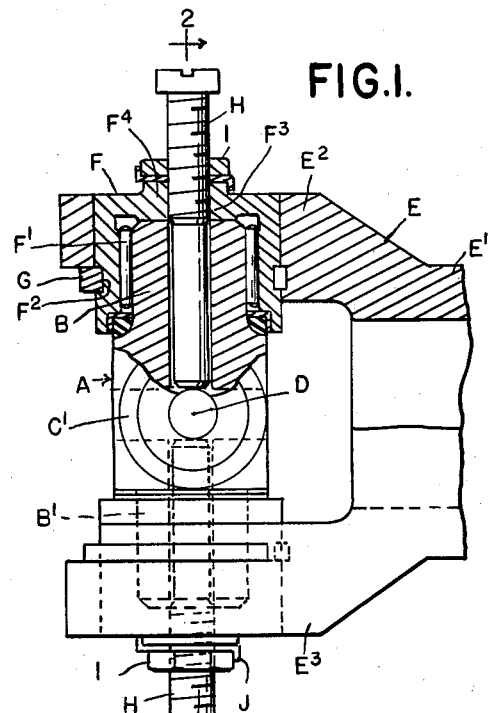
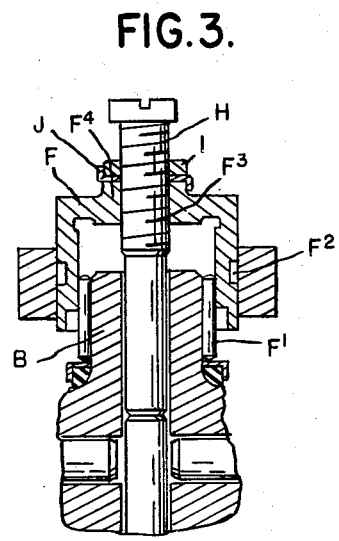
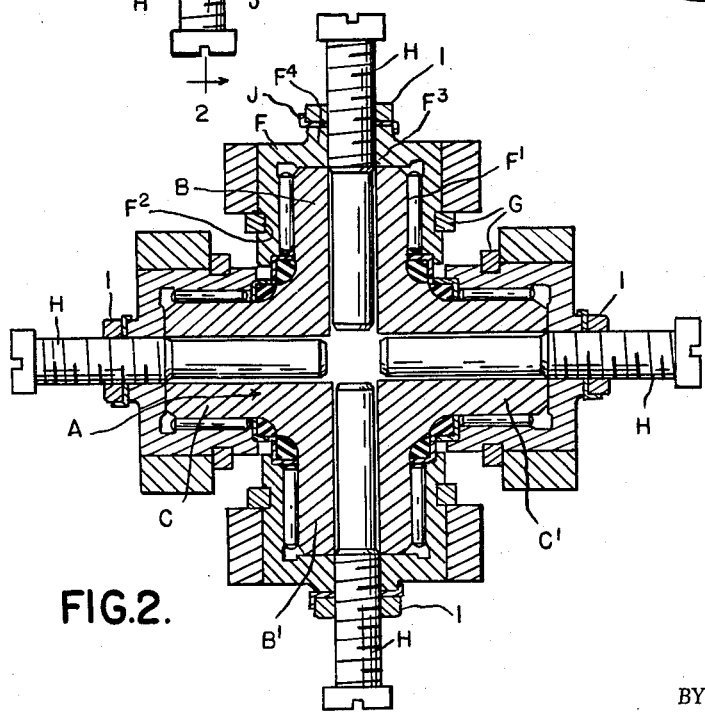
INVENTOR.
ROBERT C. ZELLER
BY
ATTORNEYS

United States Patent Office 2,839,904
Patented June 24, 1958

2,839,904

BALANCING MEANS FOR UNIVERSAL JOINTS

Robert C. Zeller, Defiance, Ohio, assignor to The Zeller Corporation, Defiance, Ohio, a corporation of Ohio Application April 8, 1957, Serial No. 651,259

3 Claims. (Cl. 64—17)

The invention relates to universal joints of that type including a central member having pairs of trunnions with their axes in the same plane and at right angles to each other and rotary members having bifurcated end bearings respectively engaging said pairs of trunnions. Such universal joints when rotating at high speed may be out of balance with respect to the axes of rotation and it is the object of the invention to provide simple means for balancing the same. It is a further object to utilize the elements of such balancing means for performing a further function, viz. the disengagement of the bearing members from the furcations of the rotary members as a step in disassembling the joint. With these objects in view the invention consists in the construction as hereinafter set forth.

In the accompanying drawings:

Fig. 1 is a longitudinal section through the joint in the plane of the axis of one pair of trunnions.

Fig. 2 is a transverse section on line 2—2, Fig. 1.

Fig. 3 is a view similar to a portion of Fig. 1, illustrating the disengagement of a bearing member from a furcation of a rotary member.

A is the central member of the universal joint having pairs of trunnions B, B' and C, C' with their axes in the same plane at right angles to each other with the trunnions of each pair spaced equally on opposite sides of the point D of intersection of their axes. Each rotary member E has a hub portion E' and a bifurcated end portion, the furcations $E^2$ and $E^3$ of which are spaced equally from the axis of rotation and are apertured to receive the trunnions of one pair. The bearings for the trunnions are, however, separate members F, each preferably cup shaped and forming an annular race portion for rollers F' between the same and the trunnion. One method of assembling the structure as thus far described is to arrange the trunnions of one pair at an angle permitting insertion of one of the trunnions through the aperture in one of the furcations and then turning it and moving it outward sufficiently for engagement of the opposite trunnion with the other furcation. The bearings F may then be inserted from the outer end of each furcation and when properly positioned locked by suitable means, such as a split locking ring G engaging an annular channel $F^2$ of the member F and bearing against the inner face of the furcation. The construction as thus far described is a well known type of universal joint.

For balancing such structure in relation to the axis of rotation I have formed each member F with an internally threaded socket $F^3$ in the end portion $F^4$ of the cup and concentric with the axis of the trunnion. Screw threaded members H are then engaged with said sockets to project outward therefrom and adjustable to vary the distance which each projects outward with respect to the axis of rotation. Preferably the members H are headed screws and to provide sufficient length of engagement with the socket, the trunnion, such as B, has a bore extending axially thereof for receiving a portion of the screw but without threadedly engaging the same. A lock nut I engaged with the screw H bears against the end portion $F^4$ or a lock washer J between the same and said portion.

With the construction as just described the screws H when unlocked may be adjusted either inward or outward with respect to the axis of rotation to compensate for any lack of balance, and when properly adjusted may be locked by the nut I. This permits of changing the center of gravity of the structure to lie within the axis of rotation and to thereby effect the balancing.

Another function of the screws H is to assist in disassembling the joint without any injury to the elements thereof. The members F form a relatively tight fit within the apertures in the furcations $E^2$ and $E^3$ and consequently after they have once been pressed into engagement it is rather difficult to remove the same. However by unlocking the screw H and moving it inward its inner end will abut against either the bottom of the recess within the hollow trunnion or in case this recess extends through both trunnions of the pair, said screw may abut against the inner end of the other screw. Further rotation of the screw will force the member F outward and without any injury thereto. However when the screws H are adjusted for balancing the joint their inner ends are out of contact with any other portion of the structure.

What I claim as my invention is:

1. In a universal joint of the type comprising a center member having pairs of trunnions with their axes in the same plane at right angles to each other and rotary members having bifurcated end bearings engaging the respective pairs of trunnions; balancing means including a threaded socket secured to be coaxial with each trunnion, a screw adjustable in said socket to extend outward therefrom and locking means for said screw in each position of adjustment thereof whereby balancing may be accomplished by adjusting said screws into variable positions of extension.

2. The construction as in claim 1 further provided with a separate bearing member for each trunnion engageable in an aperture in the corresponding furcation of the rotary members, said threaded socket being integral with said bearing member, an abutment for the inner end of said screw against which it may be pressed to force said bearing member out from engagement with its furcation.

3. The construction as in claim 2 in which said abutment is formed by the screw in the socket of the separate bearing for the other trunnion of the pair.

References Cited in the file of this patent

UNITED STATES PATENTS

| 779,903 | Bocorselski | Jan. 10, 1905 |
| 1,497,735 | Richardson | June 17, 1924 |
| 1,918,613 | Peters | July 18, 1933 |

FOREIGN PATENTS

| 691,079 | Great Britain | May 6, 1953 |